UNITED STATES PATENT OFFICE.

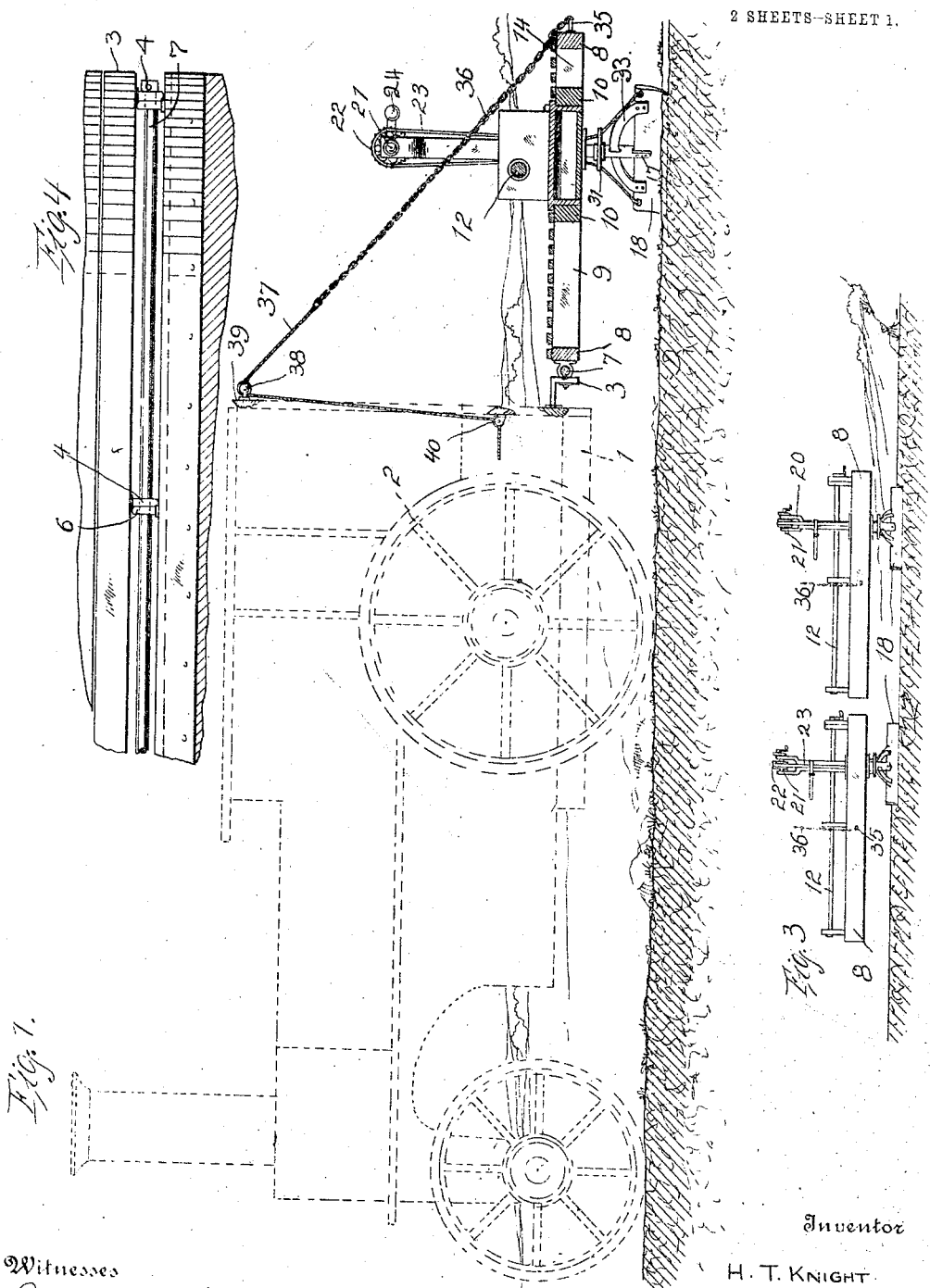

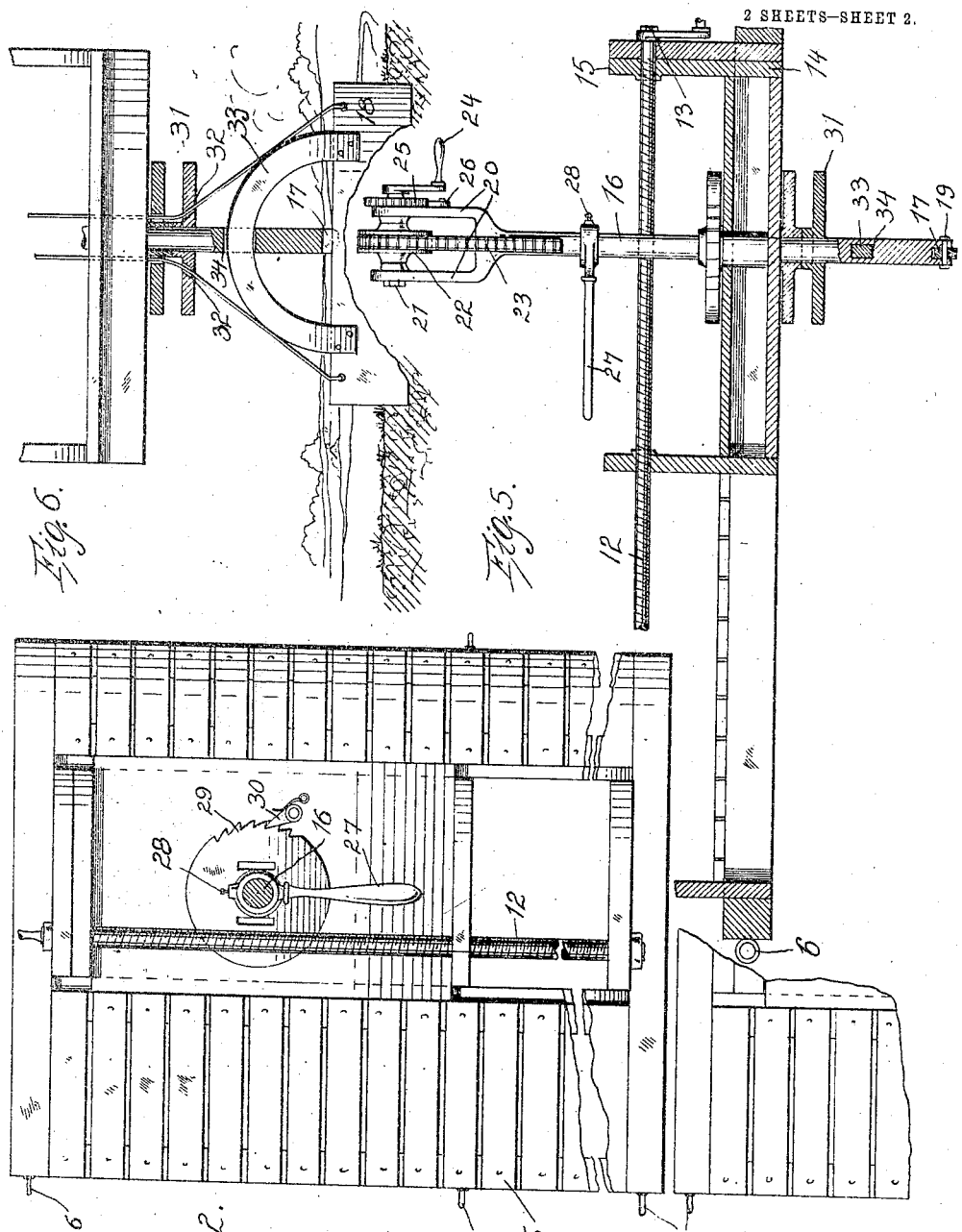

HENRY T. KNIGHT, OF SUMMERLAND, MISSISSIPPI.

ROAD-MACHINE.

1,082,959.   Specification of Letters Patent.   Patented Dec. 30, 1913.

Application filed February 6, 1913. Serial No. 746,657

*To all whom it may concern:*

Be it known that I, HENRY T. KNIGHT, a citizen of the United States, residing at Summerland, in the county of Jones and State of Mississippi, have invented certain new and useful Improvements in Road-Machines, of which the following is a specification, reference being had to the accompanying drawings.

This invention relates to new and useful improvements in machines for making and repairing roads, the object of the invention being to provide a new and improved machine suitable for grading, ditching and leveling, in which the various adjustments of the scraper blades may be easily and quickly made, and in which the machine as a whole will be simple and economical in construction and operation.

Another object of the invention is to provide a machine of the above character which will possess advantages in points of efficiency and durability, is inexpensive of manufacture and at the same time is simple in construction and operation.

With the above and other objects in view, the invention consists in the novel features of construction and the combination and arrangement of parts hereinafter more fully described, pointed out in the claims and shown in the accompanying drawings, in which—

Figure 1 is a longitudinal sectional view showing the device applied to the rear of the traction engine. Fig. 2 is a top plan view, the scraper adjusting parts being removed. Fig. 3 is a rear elevation showing the scrapers arranged in juxtaposition. Fig. 4 is a detail plan view illustrating the manner of securing the scrapers to the rear of the traction engine. Fig. 5 is a longitudinal sectional view, and Fig. 6 is a side elevation of one of the carriage members, parts being broken away and in section.

Referring more particularly to the drawings, 1 indicates the platform of a traction engine, upon each side of which is arranged the wheels 2. At the rear of the platform is secured a transverse beam 3 having a plurality of loops 4 secured thereto and arranged in spaced relation. Arranged within the rear of the traction engine are the supporting frames 5 arranged in longitudinal alinement and provided upon the forward edge thereof with the loops 6 which are adapted to be arranged beside the loops 4 upon the rear of the platform 1. A rod 7 is passed through the loops 4 and 6 to pivotally secure the supporting frames 5 to the traction engine.

Each of the frames 5 comprise the longitudinal bars 8 suitably connected at their ends to the transverse bars 9. Arranged in spaced relation and substantially midway between the bars 8 are the guide bars 10 having their ends secured to the transverse bars 9. Arranged between the bars 10 and 8 and having their ends secured thereto are the strips 11 which form a suitable platform upon which the operator may stand, if desired. Extending upwardly from the transverse bars 9 and having their lower ends secured thereto are the brackets 11' which are arranged between the guide bars 10. Mounted within one of the upper corners of the brackets 11 is a threaded rod 12, one end of which is provided with a square portion 13 upon which a handle member may be engaged to rotate the rod.

Arranged between the guide bars 10 and adjustably mounted upon the rod 12 is a carriage member 14 which is adapted to be adjusted from one end of the platform to the other upon the rotation of the rod 12, said rod extending through the threaded openings formed in the upper corners of the end pieces 15 of the carriage. Mounted within the carriage member 14 and disposed in a vertical position is a shaft 16, the lower end of which projects downwardly and is disposed beneath the bottom of the frame, said shaft having its lower end bifurcated to form two spaced ears 17 which are disposed upon opposite sides of the central portion of a blade 18 and pivotally secured to the upper edge thereof by means of a pin 19. Secured to the upper end of the shaft 16 are the spaced parallel arms 20 in the upper end of which is mounted a shaft 21. Mounted upon the shaft 21 and arranged between the upper ends of the arms is a sprocket 22. Engaging over the cog and extending downwardly through the bottom of the carriage 14 is a chain 23, the lower ends of which are secured to each end of the scraper blade 18.

Secured to the outer end of the shaft 21 is a handle member 24 whereby the shaft 21 may be rotated to adjust the scraper blade to various angles. Mounted upon the shaft 21 and arranged upon the outer side of one of the arms 20 is a ratchet 25 which is adapted to be engaged by the pawl 26 pivotally mounted upon one of the arms to prevent the movement of the sprocket 22 when the scraper blade has been adjusted to any desired position. Mounted upon the shaft 16 at a point below the arms 20 is a hand lever 27 which is secured to the shaft by means of the set screw 28, said set screw being removed to allow the lever 27 to be adjusted vertically upon the shaft. Mounted upon the shaft and arranged above the carriage bottom 14 is a ratchet 29 which is adapted to be engaged by a pivoted pawl 30 to prevent rotary movement of the shaft when the scraper blade has been set to the desired position. Mounted upon the shaft beneath the bottom of the carriage 14 is a guide member 31 which is provided at its ends with the openings 32 through which the chain 16 passes so as to guide the same upwardly through the openings in the carriage member. Secured to the ends of the scraper blade 18 adjacent the chain 23 is a curved member 33, the intermediate portion of which is mounted in a suitable opening 34 formed in the shaft 16.

The supporting frames 5 are provided at the rear thereof with the loops 35 in which are attached the chains 36. Secured to the other ends of the chains are the cables 37 which are adapted to pass upwardly and down over the pulleys 38 supported at the rear of the engine and mounted upon the cross piece 39 which extends transversely across the top of the engine. The ends of the cables then extend downwardly through a second set of pulleys 40. The cables may then be actuated by hand or they may extend forwardly and wind upon a suitable drum which is operated by the engine to raise and lower the rear ends of the frames 5. From this, it will be seen that the scraper blades 18 may be raised entirely off the ground so that the machine may be moved from place to place.

In the use of my improved road machine, the engine is driven along the road in the center thereof while the carriages 14 may be adjusted upon the rods 12 so that the dirt may be either scraped toward the center of the road or toward the outsides thereof. In scraping the dirt from the center of the road to the outside thereof, the carriages 14 are arranged at the inner ends of the frames 5 so that the scraper blades 18 will be disposed directly in the rear of the engine, but if it is desired to scrape the loose dirt toward the center of the road, the carriages 14 are adjusted toward the outer ends of the arms so as to scrape the dirt inwardly toward the center of the road. It will also be apparent that the scraper blades 18 may be adjusted longitudinally of the frames and arranged in any desired angular position by means of the handle member 24 which rotates the sprocket 22 to actuate the chain 23.

From the above description taken in connection with the accompanying drawings, it will be readily apparent that I have provided a simple and durable road machine which is extremely effective in its operation and which at the same time can be manufactured at a comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. In a device of the character described, the combination of a frame, a carriage member, a shaft carried by said carriage, a scraper blade pivotally secured to one end of said shaft, means for rotating said shaft to impart rotary oscillating movement to the blade and additional means for adjusting said blade with respect to the axis thereof to raise and lower the ends of the same.

2. In a device of the character described, the combination of a frame, a carriage member, a vertically disposed shaft mounted in said carriage, a scraper blade pivotally secured to the lower end of said shaft, a lever mounted on said shaft adapted to rotate the same, means for preventing backward movement of the shaft and means for adjusting said blade to various angular positions.

3. In a device of the character described, the combination of a frame, a carriage member, a vertically disposed shaft mounted in said carriage, a scraper blade pivotally secured to the lower end of said shaft, spaced arms at the upper end of said shaft, a transverse shaft mounted in said arms, means mounted upon said transverse shaft and connected to said blade for adjusting the blade to various angular positions.

4. In a device of the character described, the combination of a frame, a carriage member, a vertically disposed shaft mounted in said carriage, a scraper blade pivotally secured to the lower end thereof, spaced arms at the upper end of said shaft, a transverse shaft mounted in said arms, a sprocket mounted upon said transverse shaft and arranged between the arms, a chain mounted upon said sprocket and having its ends connected to each end of the scraper blade and means for rotating said shaft whereby the scraper will be adjusted to various angular positions.

5. In a device of the character described, the combination of a frame, a carriage member, a vertically disposed shaft mounted in said carriage, a scraper blade pivotally secured to the lower end of said shaft, a lever mounted upon said shaft for vertical adjustment and adapted to rotate the same, a ratchet mounted upon said shaft, a pawl upon the carriage and adapted to engage said ratchet to prevent backward movement of the shaft, and means for adjusting the scraper blade to various angular positions.

6. In a device of the character described, the combination of a frame comprising longitudinal bars and transverse bars having their ends connected to the ends of the longitudinal bars, guide bars having their ends secured to the transverse bars and arranged in spaced relation substantially midway between the longitudinal bars, brackets secured to the transverse bars and arranged between the guide bars, a threaded rod mounted in said brackets, a carriage member mounted for longitudinal adjustment upon said rod, a pivotally mounted scraper blade carried by said carriage and means for adjusting said blade to various angular positions.

7. In a device of the character described, the combination of a frame, a carriage member, a vertically disposed shaft mounted in said carriage, a scraper blade pivotally secured to the lower end of said shaft, said shaft being provided with an opening adjacent the lower end thereof, a brace member having its ends secured to the scraper blade adjacent each end thereof and its intermediate portion mounted within said opening, means for rotating said shaft and means for adjusting the scraper blade to various angular positions 8. In a machine of the class described, the combination of a frame, a carriage member, a vertically disposed shaft mounted in said carriage, a scraper blade pivotally secured to the lower end of said shaft, a lever mounted on said shaft to rotate the same and impart rotary oscillating movement to the scraper blade, means for preventing backward movement of the shaft and means for adjusting said blade with respect to the axis thereof to raise and lower the ends of the same.

9. In a device of the class described, the combination of a frame, a carriage member, a vertically disposed shaft mounted in said carriage, a scraper blade pivotally secured to the lower end of said shaft, said shaft being provided with an opening adjacent the lower end thereof, a brace member having its intermediate portion mounted within said opening and its ends secured to the scraper blade adjacent each end thereof, a lever mounted on said shaft adapted to rotate the same and impart rotary oscillating movement to the blade, means for preventing backward movement of the shaft and means for adjusting said blade with respect to the axis thereof to raise and lower the ends of the same.

In testimony whereof I hereunto affix my signature in the presence of two witnesses.

HENRY T. KNIGHT.

Witnesses:
  FRANTZ PICKERING,
  K. W. DUCKWORTH.